March 4, 1930.  E. KUSSA ET AL  1,749,433
BAKING PAN AND METHOD OF BAKING
Filed April 2, 1928
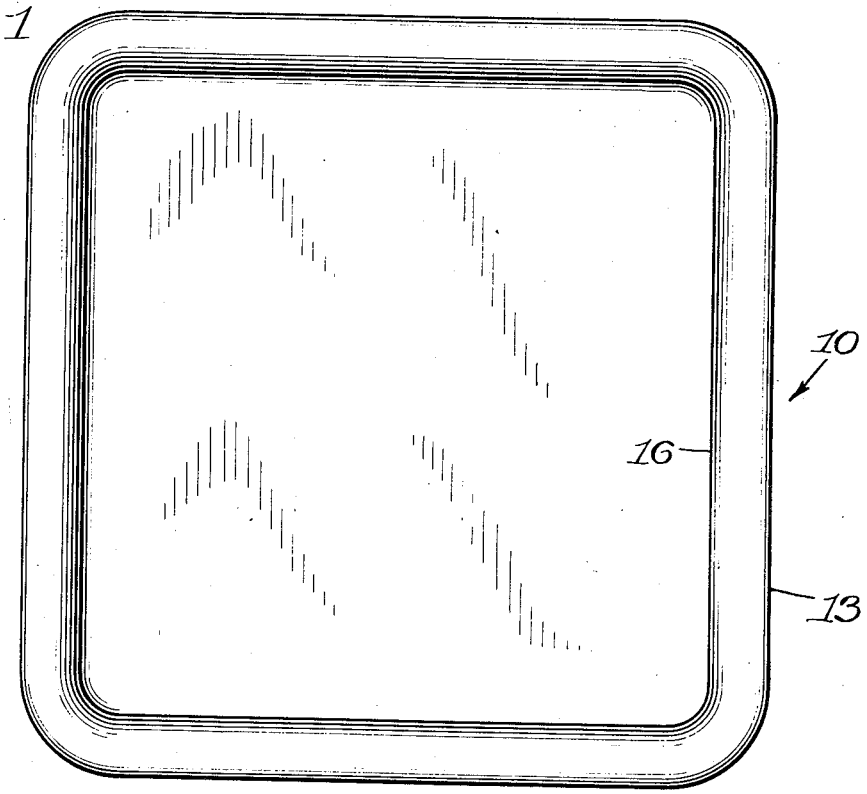
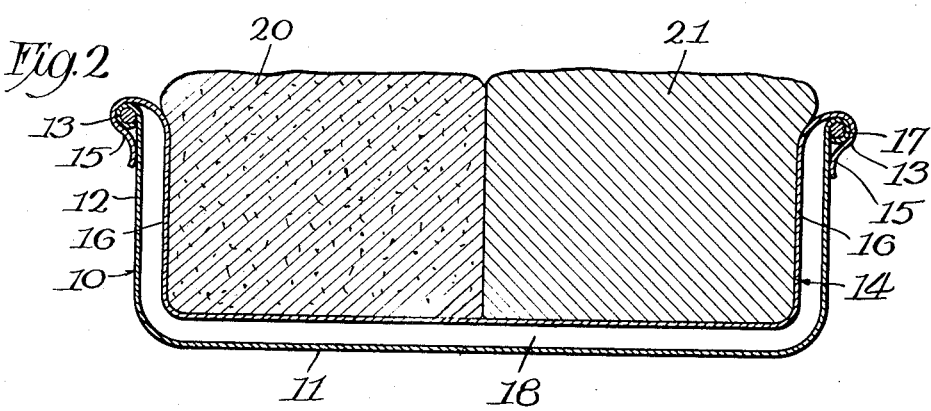
Inventors
Edward Kussa
William E. Long
By Gillson, Warrs&Cox
Attys.

Patented Mar. 4, 1930

1,749,433

UNITED STATES PATENT OFFICE

EDWARD KUSSA AND WILLIAM E. LONG, OF CHICAGO, ILLINOIS, ASSIGNORS TO THE W. E. LONG CO., A CORPORATION OF ILLINOIS

BAKING PAN AND METHOD OF BAKING

Application filed April 2, 1928. Serial No. 266,663.

This invention relates to the culinary art and has reference more particularly to the baking of food products.

One of the objects of the invention is the provision of a new and improved baking vessel so constructed that the portion of the vessel that comes in contact with the food product will be insulated from the portion that is subjected to the direct heat of the oven.

Another object of the invention is the method of baking two or more kinds of baking products in the same pan as a unitary structure and delivering the same in that condition to the consumer.

Other and further objects and advantages of the invention will appear from the following description taken in connection with the accompanying drawings, in which Fig. 1 is a top plan view of a baking pan embodying the invention; and Fig. 2 is a vertical section of a baking pan showing two kinds of food products contained therein.

In the baking of bread, cakes and the like, it is common practice to use metallic vessels, that are subjected directly to the heat of the oven during the baking operation and as a result a tough leathery crust forms on the bottom and sides of the food product due to the excessive amount of heat conducted through the walls of the baking pan or vessel.

The present invention seeks to remedy this difficulty by providing an inner vessel for containing the food product that is insulated from the outer vessel by an enclosed air space whereby the heat of the oven does not come in direct contact with the walls of the pan containing the food product.

It has been proposed to employ metallic pans or baking vessels having double walls with numerous ventilating openings in the side walls of the outer vessel to permit more or less free circulation of air within the space between the inner and outer walls of the two vessels. But this arrangement is objectionable for the reason that with the free circulation of air in the space between the pans, the inner pan is subjected directly to the heat of the oven whereby the walls of the inner pan will become overheated and the objectionable crust will be formed on the material that is being baked.

In the present invention, the inner pan is insulated from the outer by an enclosed space which will prevent the free circulation of the air in the oven through said space. The inner pan is supported from its upper edge only, and consequently the conduction or transmission of heat from the outer pan thereto is reduced to a minimum. The space is not air tight and while the connection between the two pans is such as to prevent circulation of air, it will permit the escape and entrance of air from and to the space as the air therein expands or contracts.

It is well known that still air is an excellent non-conductor of heat. In the present invention, the air space is of such dimensions that there will be sufficient circulation of the air within this space to properly heat the inner pan, but there will be practically no circulation of the air within the oven through this space with the result that the inner pan will be maintained at a temperature sufficient to properly bake the food products in a minimum period of time without heating the same to the point where the objectionable crust is formed. This is considered an important feature of the invention.

Referring now to the drawings, the reference character 10 designates an outer vessel or pan which may be, and preferably is of metal, such as sheet metal. It may be of any form, that shown by way of example being substantially rectangular.

This pan or vessel comprises the bottom wall 11 and the side walls 12. The upper edge of the side walls may, if desired, be reinforced by rolling the same into a bead 13. The bead may be rolled around a wire or rod 17 as a reinforcement member, as is common in such constructions. Since this pan may be of the usual or any well known construction, a further description of the same is deemed unnecessary.

An inner pan or vessel 14 which may also be of metal and of slightly less dimensions than the outer pan 10, is mounted within the outer pan and is held in spaced relation thereto in any suitable manner. As shown, the extended portions 15 of the side walls 16 are bent over the bead 13 whereby the two pans are secured together at their upper ends and their side and bottom walls are spaced from each other to form an insulating air space 18.

The connection between the two pans, while being sufficient to prevent free circulation of the air in the oven through the air space 18, will permit the escape and entrance of air from and into the space as a result of the expansion and contraction of the air within said space 18 as the temperature of the pans varies.

By means of this arrangement, the food product may be maintained at the desired temperature for baking without subjecting the pan with which it is in contact to the direct action of the heat of the oven with the result that the food will be properly cooked without the formation of the objectionable crust on the sides and bottom thereof.

In retail delivery of bakery products, it frequently happens that the customer desires two or more products of the same class but of different kinds. As for instance, the customer may desire two loaves of different kinds of bread, one of white bread and one of whole wheat. By the method of baking herein disclosed, the two loaves may be delivered together without the necessity of breaking them apart, thus reducing the surface exposed to the drying effect of the atmosphere and also greatly reducing the time and cost of wrapping the products separately.

Where the bakery employee has his regular route and certain customers desire two or more products of different kinds, either daily or only for the next day's delivery, the employee turns in his orders and these products are baked together in the same pan, thus saving considerable time in handling and wrapping.

The method of accomplishing this is indicated in Fig. 2 in which the reference character 20 designates a bakery product of one kind, as a loaf of whole wheat bread and the reference character 21 a loaf made from white flour. Dough enough for making each of these two loaves is placed within the same pan as shown in Fig. 2, and the two loaves are baked together. They are then wrapped together just as they come out of the pan, that is without separating them, and they may be delivered to the customer in that form, thus economizing in time and trouble in wrapping, handling and delivering, which is an important factor in distributing bakery products on a large scale as in large cities or densely populated areas.

It is thought from the foregoing taken in connection with the accompanying drawings that the construction and use of our device will be apparent to those skilled in the art, and that changes in size, shape, proportion and details of construction may be made without departing from the spirit and scope of the appended claim.

We claim as our invention:

In a device of the class described, an outer imperforate metallic vessel having a rolled edge, an inner imperforate metallic vessel having its marginal edge closed about the rolled edge of said outer vessel and forming the sole means of support of said inner vessel, said closure being sufficiently tight to hinder the free circulation of air between said inner and outer vessels but providing passages through which air may be forced by positive pressures resulting from the heating or cooling of said vessels.

In testimony whereof we affix our signatures.

WILLIAM E. LONG.
EDWARD KUSSA.